United States Patent
Brock (10) Patent No.: US 10,534,944 B1
(45) Date of Patent: Jan. 14, 2020

(54) METHOD AND APPARATUS FOR DECODING MULTIPLE SYMBOLOGY TYPES

(71) Applicant: Zebra Technologies Corporation, Lincolnshire, IL (US)

(72) Inventor: Christopher W. Brock, Manorville, NY (US)

(73) Assignee: Zebra Technologies Corporation, Lincolnshire, IL (US)

(\*) Notice: Subject to any disclaimer, the term of this patent is extended or adjusted under 35 U.S.C. 154(b) by 0 days.

(21) Appl. No.: 16/221,704

(22) Filed: Dec. 17, 2018

(51) Int. Cl.
*G06K 7/10* (2006.01)

(52) U.S. Cl.
CPC ..... *G06K 7/10722* (2013.01); *G06K 7/10881* (2013.01); *G06K 2007/10524* (2013.01)

(58) Field of Classification Search
CPC ........... G06K 7/10722; G06K 7/10881; G06K 2007/10524
USPC ................ 235/462.01–462.49, 454
See application file for complete search history.

(56) References Cited

U.S. PATENT DOCUMENTS

| | | | |
|---|---|---|---|
| 6,543,693 B1* | 4/2003 | Stern | G06K 7/10574 235/462.35 |
| 6,607,134 B1* | 8/2003 | Bard | G04B 47/00 235/462.44 |
| 2005/0077359 A1* | 4/2005 | Boehm | G06K 7/10544 235/454 |
| 2006/0087580 A1* | 4/2006 | Xie | G02B 7/08 348/335 |
| 2009/0026267 A1* | 1/2009 | Wang | G06K 7/10 235/440 |

\* cited by examiner

*Primary Examiner* — Daniel A Hess
(74) *Attorney, Agent, or Firm* — Yuri Astvatsaturov (57) ABSTRACT

A method and apparatus for capturing images of symbols and decoding symbols based on the distance of the target from the reader. The distance of the symbol from the reader causes the controller to switch between different parameters, imaging assemblies, decode modules and/or decode approaches in order to decode different symbology types.

23 Claims, 7 Drawing Sheets

METHOD AND APPARATUS FOR DECODING MULTIPLE SYMBOLOGY TYPES

BACKGROUND OF THE INVENTION

Typical barcode readers are able to read barcodes using a common decode approach. However, some barcode symbologies require a significantly different decode approach. For example, high-density symbologies, such direct part marking and dot code, required different illumination and different decoding algorithms than low-density symbologies, such as UPC. As such, many barcode readers are generally unable to read barcodes that require significantly different decode approaches. Other barcode readers are able to cycle through various symbology types in an attempt to find one that decodes the barcode, but this requires considerable time and processing power.

Accordingly, there is a need for devices, systems, and methods for determining different symbology types in a target and enacting adjustments to decode the determined symbology type.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure provides an apparatus that includes a housing, an imaging assembly positioned within the housing, and a controller operatively coupled to the imaging assembly. The imaging assembly includes an image sensor, and the imaging assembly is configured to automatically vary a focal plane associated with the imaging assembly to focus on a symbol at a given distance from the imaging assembly. The focal plane is where an image of the symbol is sharpest from an imaging surface of the image sensor, and the image sensor is configured to capture at least one of: light reflected from the symbol and light emitted from the symbol. The controller is configured in a first state to utilize a first parameter to decode a first symbology type and configured in a second state to utilize a second parameter to decode a second symbology type. The first symbology type is different from the second symbology type. The controller is configured to switch between the first state to the second state in response to the focal plane associated with the imaging assembly.

A further aspect of the present disclosure provides an apparatus that includes a housing, a first imaging assembly positioned within the housing, a second imaging assembly positioned within the housing, and a controller operatively coupled to the first and second imaging assemblies. The first imaging assembly includes a first image sensor. The first imaging assembly is configured to focus on a symbol at a first distance from the imaging assembly, and the first image sensor is configured to capture at least one of: light reflected from the symbol and light emitted from the symbol. The second imaging assembly positioned includes a second image sensor. The second imaging assembly is configured to focus on a symbol at a second distance from the imaging assembly, and the second image sensor is configured to capture at least one of: light reflected from the symbol and light emitted from the symbol. The controller is configured to switch between the first and second imaging assemblies in response to the distance of the symbol from the imaging assemblies. In response to switching to the first imaging assembly, the controller is configured to decode a first symbology type, and in response to switching to the second imaging assembly, the controller is configured to decode a second symbology type. The first symbology type is different from the second symbology type.

Another aspect of the present disclosure provides an apparatus that includes an imaging assembly positioned within the housing, and a controller operatively coupled to the imaging assembly. The imaging assembly includes an image sensor, and the image sensor is configured to capture at least one of: light reflected from the symbol and light emitted from the symbol. The controller includes a first module configured to decode a high-density symbol having at least one element with a width of less than 3 mils and a second module configured to decode a low-density symbol having at least one element with a width of greater than 5 mils. The controller is configured to switch between the first and second modules in response to a distance of the symbol from the imaging assembly.

Yet another aspect of the present disclosure provides an apparatus that includes a housing, an imaging assembly positioned within the housing, an illumination assembly positioned within the housing, and a controller operatively coupled to the imaging assembly and the illumination assembly. The imaging assembly includes an image sensor, and the image sensor is configured to capture at least one of: light reflected from the symbol and light emitted from the symbol. The illumination assembly is configured to emit light. The controller is configured in a first state to utilize at least one of: a first decode approach to decode a first symbology type and a first illumination parameter to capture an image of the first symbology type. The controller is also configured in a second state to utilize at least one of: a second decode approach to decode a symbology type and a second illumination parameter to capture an image of the second symbology type. The controller is further configured to switch between the first state to the second state in response to a distance of the symbol from the imaging assembly.

Figure 1:
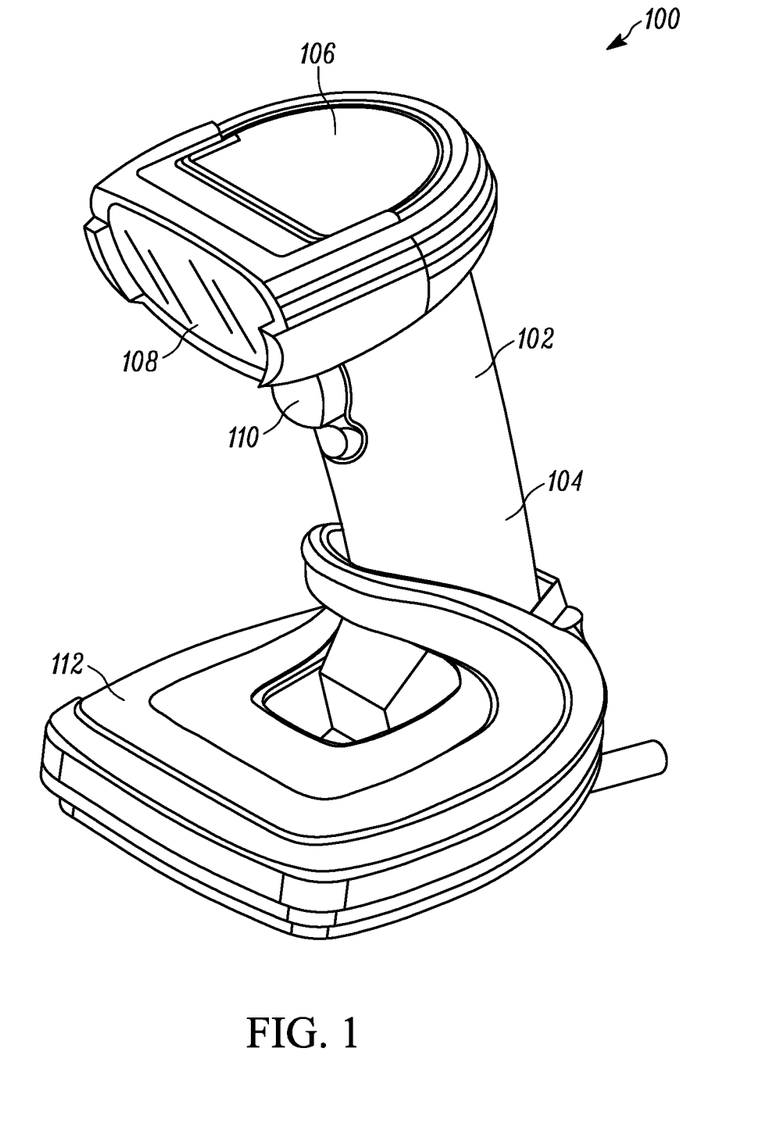
FIG. 1 illustrates a perspective view of a barcode reader in accordance with an embodiment.

Referring now to the drawings, FIG. 1 illustrates an exemplary barcode reader 100 having a housing 102 with a handle portion 104, also referred to as a handle 104, and a head portion 106, also referred to as a scanning head 106. The head portion 106 includes a window 108, and is configured to be positioned on the top of the handle portion 104. The handle portion 104 is configured to be gripped by a reader user (not shown) and includes a trigger 110 for activation by the user. Included in the embodiment is also a base 112 attached to the handle portion 104 opposite the head portion 106. The base 112 is configured to stand on a surface and support the housing 102 in a generally upright position. The barcode reader 100 can be used in a hands-free mode as a stationary workstation when it is placed on a countertop. The barcode reader 100 can also be used in a handheld mode when it is picked up off the countertop and held in an operator's hand. In the hands-free mode, products can be slid, swiped past, or presented to the window 108. In the handheld mode, the barcode reader 100 can be moved towards a barcode on a product, and the trigger 110 can be manually depressed to initiate imaging of the barcode. In some implementations, the base 112 can be omitted, and the housing 102 can also be in other handheld shapes. Other implementations may provide only handheld or only hands-free configurations.

Figure 2:
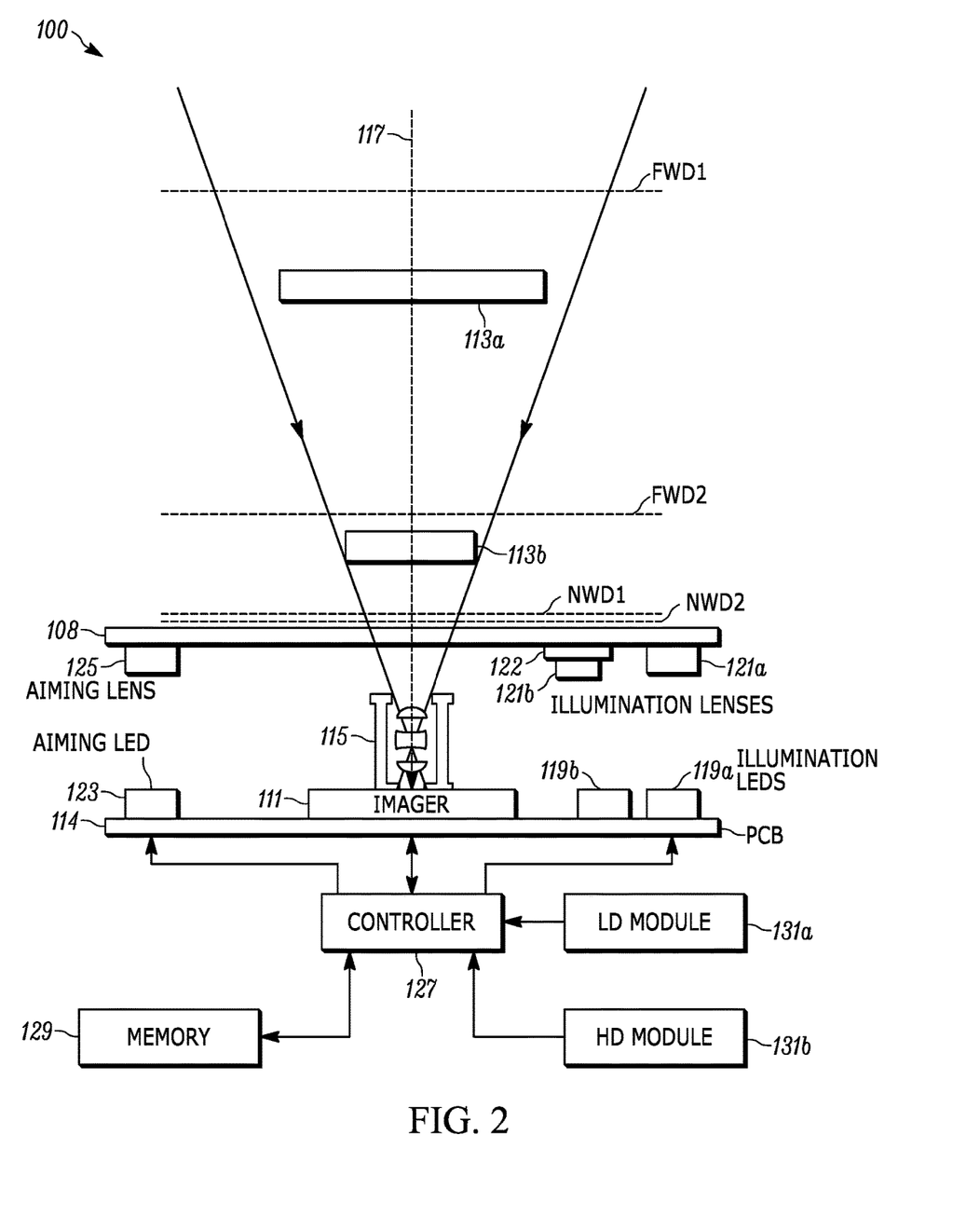
FIG. 2 is a schematic of various components of the reader of FIG. 1 in accordance with an embodiment.

Referring to FIG. 2, which depicts various components of the reader 100 of FIG. 1, an imaging assembly includes a light-detecting sensor or imager 111 operatively coupled to, or mounted on, a printed circuit board (PCB) 114 in the reader 100. In an embodiment, the imager 111 is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by an imaging lens assembly 115 over a field of view along an imaging axis 117 through the window 108 in either mode of operation. The return light is scattered and/or reflected from a target 113a, 113b over the field of view. The imaging lens assembly 115 is operative for automatically focusing the return light onto the array of image sensors to enable the target 113a, 113b to be in-focus and read. In particular, different barcode symbologies may need to be read at different distances, thereby requiring the imaging lens assembly 115 to have different focal planes in order to focus the image of the target on the imager 111. For example, the target 113a (e.g., Universal Product Code symbology) may be read from a distance farther from the imager 111, and therefore having a farther focal point, than the target 113b (e.g., direct part mark symbology, dot code symbology). Thus, the target 113a may be located anywhere in a first working range of distances between a first near working distance (NWD1) and a first far working distance (FWD1), and the target 113b may be located anywhere in a second working range of distances between a second near working distance (NWD2) and a second far working distance (FWD2). In a preferred embodiment, both NWD1 and NWD2 are immediately in front of the window 108, and FWD1 is about thirty inches from the window 108, whereas FWD2 is about three inches or less from the window 108.

As noted above, the imaging lens assembly 115 automatically focuses on the target 113a, 113b in the embodiment of FIG. 2. Any of a number of different mechanisms as understood by those of ordinary skill in the art may be used to vary the focal plane of the imaging lens assembly 115 and automatically focus on the target 113a, 113b. For example, the imaging lens assembly 115 may vary the focal plane by physically varying the distance of a focusing lens(es) from the surface of the imager 111 along the imaging axis 117 in order to focus the image of the target on the imager 111. In another example, the imaging lens assembly 115 may utilize a changeable focusing lens(es), such as a liquid lens, and vary the focal plane by varying the optical characteristics of the focusing lens(es) (e.g., by application of voltage to the lens) in order to focus the image of the target on the imager 111.

The amount by which the focal plane of the imaging lens assembly 115 is varied is dependent upon the distance of the target as detected by the reader 100. A number of techniques exist for determining how much to adjust the imaging lens assembly 115 to focus on the target, as understood by those of ordinary skill in the art. Broadly, the techniques may be categorized as either active autofocus, passive autofocus, or a hybrid of the two. Active autofocus typically uses time-of-flight techniques, such as a rangefinder (not shown) projecting light (e.g., infrared) or ultrasound onto the target, measuring the time to receive the return signal in order to measure the distance of the target, and adjusting the focal plane of the imaging lens assembly 115 accordingly. Passive autofocus typically uses phase detection and contrast detection. Phase detection compares the intensity pattern of two images produced in an array of auxiliary sensors (not shown) apart from the imager 111, and adjusts the focal plane of the imaging lens assembly 115 in proportion to the degree to which the images are out-of-phase until the images are synchronized. Contrast detection varies the focal plane of the imaging lens assembly 115 in order to maximize the contrast between adjacent pixels in the image.

The distance of the target 113a, 113b from the imager 111 may be determined from the focal plane of the imaging assembly using a physically variable lens. In particular, the focal plane of the imaging assembly is proportional to the distance of the target 113a, 113b from the imager 111. For example, the distance $d_o$ of the target 113a, 113b may be derived from the distance $d_i$ of the focusing lens of the imaging assembly from the imager 111 and the focal length of the focusing lens in the imaging lens assembly 115 using the thin lens equation: $1/d_o + 1/d_i = 1/f$. For a changeable focusing lens, such as a liquid lens, the focal plane may be determined from the control signal applied to the lens, such as the DC voltage of the applied control signal.

One or more illuminating light assemblies are also mounted in the imaging reader 100. Each illuminating light assembly includes an illumination light source, such as at least one light emitting diode (LED) 119a, 119b and at least one illumination lens 121a, 121b, and preferably a plurality of illumination LEDs and illumination lenses, configured to generate a substantially uniform distributed illumination pattern of light on and along the target 113a, 113b to be read by image capture. At least part of the scattered and/or reflected return light is derived from the illumination pattern of light on and along the target 113a, 113b. In an embodiment, one of the illumination light assemblies includes a diffuser 122 for reading targets 113b that reflect the illumination light in several directions and/or have little contrast in the symbol, such as direct part marking. Preferably, the illumination light LED 119b uniformly illuminates most or all of the diffuser 122, which, in turn, diffuses the light from the illumination LED 119b across an illumination field of view (not shown) to illuminate a barcode within the illumination FOV.

An aiming light assembly is also mounted in the imaging reader 100 and preferably includes an aiming light source 123, (e.g., one or more aiming LEDs), and an aiming lens 125 for generating and directing a visible aiming light beam away from the reader 100 onto the target 113a, 113b in the handheld mode. The aiming light beam has a cross-section with a pattern, for example, a generally circular spot or cross-hairs for placement at the center of the target 113a, 113b, or a line for placement across the target 113a, 113b, or a set of framing lines to bound the field of view, to assist an operator in visually locating the target 113a, 113b within the field of view prior to image capture.

In an embodiment, an image of the aiming pattern on the target 113a, 113b is used to determine the distance of the target 113a, 113b from the reader 100. In particular, parallax of the image of the aiming pattern on the target 113a, 113b is used to approximate the distance of the target 113a, 113b from the reader 100 by measuring the apparent displacement of the aiming pattern in relation to the target based on different lines of sight. In addition, the magnification of the aiming pattern on the target 113a, 113b is used to approximate the distance of the target 113a, 113b from the reader. Knowing the height $h_o$ of the aiming pattern as projected from the reader 100, the height $h_i$ of the image of the aiming pattern, and the distance $d_i$, of the focusing lens of the imaging assembly from the imager 111, the distance $d_o$ of the target 113a, 113b may be derived from the equation: $M*k=h_i/h_o=-d_i/d_o$, with k being a scaling constant. Although the determined distance may not be quite the same as the actual distance, the determined distance is sufficient to act as an approximate distance for which to select parameters for decoding the symbol. However, in a potential embodiment, calibration may be performed to establish a more definitive distance.

As also shown in FIG. 2, the imager 111, the illumination LEDs 119a, 119b, and the aiming LED 123 are operatively connected to a controller or programmed microprocessor 127 operative for controlling the operation of these components. A memory 129 is connected and accessible to the controller 127. Preferably, the microprocessor 127 is the same as the one used for processing the captured return light from the illuminated target 113a, 113b to obtain data related to the target 113a, 113b.

As further illustrated in FIG. 2, one or more decode modules 131a, 131b are operatively coupled to the controller 127. The decode modules 131a, 131b correspond to decode approaches or decode algorithms for decoding a symbol captured in an image of the target 113a, 113b. For example, a UPC barcode requires a different decoding approach, as may be provided by a low-density decode module 131a, than a direct part marking code, which requires a decoding approach as may be provided by a high-density decode module 131b. In an embodiment, low-density symbol decoding corresponds to decoding of symbologies with an element that has a width of greater than 5 mils, and a high density symbol decoding corresponds to decoding of symbologies with an element that has a width of less than 3 mils. Additional modules may be provided for additional densities or ranges of densities. In an embodiment, each module 131a, 131b corresponds to a particular symbology, whereas in another embodiment, each module 131a, 131b corresponds to a particular set of symbologies (e.g., a set of low-density symbologies, and a set of high-density symbologies). In the latter embodiment, the controller 127 attempts to decode a symbol captured in an image by the imager 111 using the first symbology in the set of symbologies of a selected module 131a, 131b. If the decode is unsuccessful, the controller 127 proceeds to decode the symbol using the second symbology in the set of symbologies of the selected module 131a, 131b, and so on. While this may not result in immediately decoding the symbol captured in the image, it does reduce the number of symbologies that the controller 127 attempts to decode (e.g., just high-density symbologies rather than all symbologies).

As discussed further below, different decode approaches or decode algorithms utilize different parameters to decode a symbol captured in an image by the imager 111 based on the distance of the target 113a, 113b from the reader 100. This may include a selection of symbology or set of symbologies to decode, such as a selection between decode modules 131a, 131b, and/or a selection of illumination states to illuminate the target 113a, 113b, such as a selection between activation of the illumination LEDs 119a, 119b.

Figure 3:
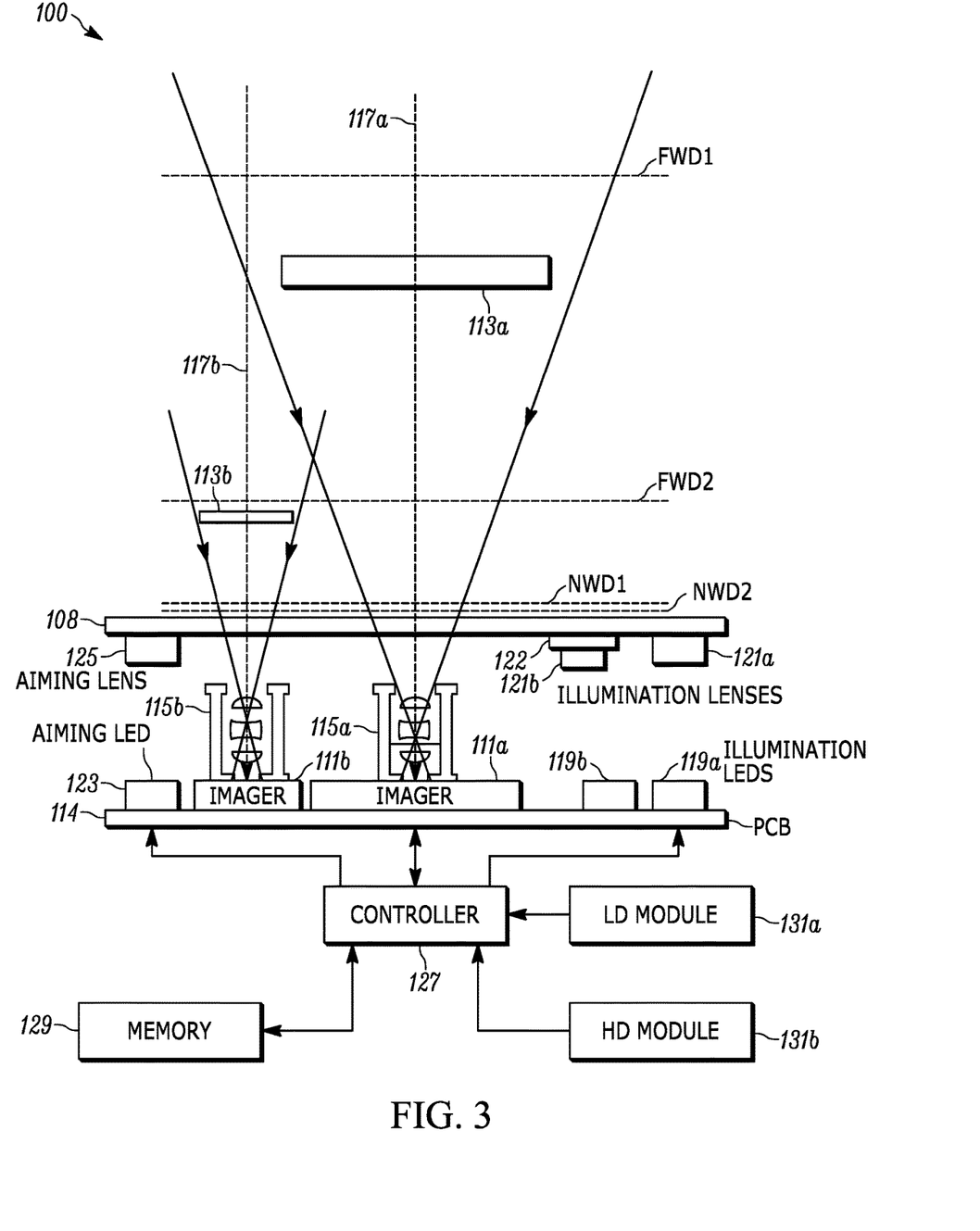
FIG. 3 is a schematic of various components of the reader of FIG. 1 in accordance with another embodiment.

FIG. 3 is an alternative embodiment of the reader 100 of FIG. 1. In FIG. 3, like elements are indicated by like references as in FIG. 2, and need not be discussed further for this embodiment. The imaging engine includes multiple light-detecting sensors or imagers 111a, 111b operatively coupled to, or mounted on, a printed circuit board (PCB) 114. In an embodiment, each imager 111a, 111b is a solid-state device, for example, a CCD or a CMOS imager, having a one-dimensional array of addressable image sensors or pixels arranged in a single row, or a two-dimensional array of addressable image sensors or pixels arranged in mutually orthogonal rows and columns, and operative for detecting return light captured by respective imaging lens assemblies 115a, 115b over a field of view along respective imaging axes 117a, 117b through the window 108. The return light is scattered and/or reflected from a target 113a, 113b over the respective fields of view.

In an embodiment, each lens assembly 115a, 115b has a different focal plane. For example, a first lens assembly 115a may be a fixed focus lens assembly that has a focal plane for reading a low-density target 113a within the first far working distance (FWD1) and the first near working distance (NWD1), whereas a second lens assembly 115b may be a fixed focus lens assembly that has a focal plane for reading a high-density target 113b between the second far working distance (FWD2) and the second near working distance (NWD2). In another embodiment, either or both of the lens assemblies may be automatic focus lens assemblies as discussed above, though each optimized for focusing on targets 113a, 113b within their respective working distances.

Generally, the reader 100 of FIG. 3 utilizes active methods for determining which image assembly to utilize, such as a rangefinder (infrared, ultrasound, etc.) and time-of-flight techniques. Alternatively, the reader 100 of FIG. 3 may utilize parallax or magnification of the aiming pattern from the aiming light assembly to approximate the distance of the target from the reader 100, as discussed above.

Based on the distance of the target 113a, 113b from the reader 100, the controller 127 selects the corresponding image assembly (and illumination assembly, if applicable) to capture an image of the target 113a, 113b. For example, for the target 113a, the controller 127 may determine that the distance of the target 113a corresponds to that of a low-density barcode (e.g., UPC, etc.), activates the illumination source 119a, and causes the imager 111a to capture an image of the target 113a. Moreover, the controller 127 may then select the module 131a for decoding the symbol in the image, as discussed above. On the other hand, for the target 113b, the controller 127 may determined that the distance of the target 113a corresponds to that of a high-density barcode (e.g., direct part marking, dot code, etc.), activates the illumination source 119b, causes the imager 111b to capture an image of the target 113b, and selects the module 131b for decoding the symbol in the image, as discussed above.

In another embodiment, each imager 111a, 111b may capture an image of its respective target 113a, 113b and the controller 127 may determine which is most in-focus (e.g., phase detection, contrast detection, etc.). Thereafter, the controller 127 selects the module 131a, 131b that corresponds to the imager 111a, 111b that captured the image that is the most in-focus for decoding the symbol in the captured image.

Figure 4:
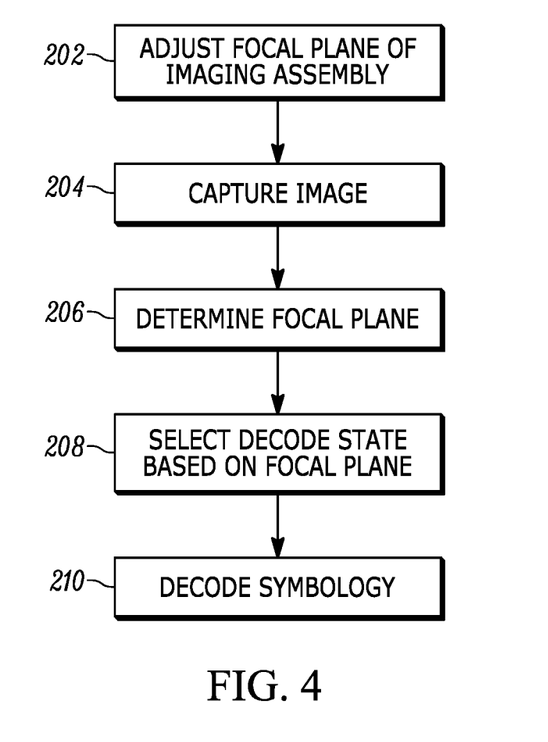
FIG. 4 is a flowchart of a method of capturing images of symbols and decoding symbols based on the distance of the target from the reader in accordance with the embodiment of FIG. 2.

FIGS. 4-7 are flowcharts of various embodiments for capturing images of symbols and decoding symbols based on the distance of the target from the reader 100. In particular, FIG. 4 is a flowchart of an embodiment of the aforementioned method that may be utilized by a reader 100 with an automatic focus imaging assembly as in the embodiment of FIG. 2. Beginning at block 202, the method begins with the imaging assembly attempting to focus on the target 113a, 113b. In particular, the imaging assembly adjusts the focal plane of the imaging lens assembly 115, by, for example, using passive or active focusing techniques described above.

Once the image lens assembly 115 has focused upon the target 113a, 113b, an image of the target is captured at block 204, and the focal plane of the image assembly when the image is captured is determined at block 206, as previously described. As also previously described, there is a correlation between the focal plane of the image lens assembly and the distance of the target 113a, 113b from the imager 111, and there is a correlation between the distance of the target 113a, 113b from the reader 100 (with a known distance between the nose or window 108 of the reader 100 and the imager 111) and the symbology of the target 113a, 113b. Accordingly, at block 208, the controller 127 selects a decode state that corresponds to the focal plane of the image lens assembly 115. In an embodiment, selection of a decode state corresponds to selection of particular parameters for decoding a particular symbology or set of symbologies. In another embodiment, those parameters may be stored within, or called upon by, the above-described modules, such that the selection of a decode state corresponds to the controller 127 selecting a particular module 131a, 131b.

As noted, the decode state may include one or more parameters associated with decoding a particular symbology. One parameter of the decode state may include an illumination parameter that differs based upon the symbol to be decoded. For example, a target 113b that is close to the reader 100 may likely be a direct part marking code, which utilizes diffused illumination. As such, the decode state for a direct part mark may include activation of the diffused illumination assembly (e.g., activation of the illumination source 119b). As another example, the illumination parameter corresponds to an intensity of illumination, such that targets that are farther away may require a more intense (e.g., brighter) illumination from the illumination source 119a, 119b than targets that are closer to the reader 100.

Another parameter associated with a particular decode state includes the symbology utilized by the controller 127 to decode the symbol captured in the image. In an embodiment, the selected symbology may be a specific symbology selected by the controller 127 (e.g., UPC, direct part marking, dot code, etc.) based on the focal plane of the image lens assembly 115 when the image of the symbol was captured. In another embodiment, the selected symbology may be a set of symbologies selected by the controller 127 based on the focal plane of the image lens assembly 115. For example, if the focal plane corresponds to a target 113a that is within the first working range (i.e., between NWD1 and FWD1), it may be assumed that the symbol is a low-density symbol, such that the controller 127 selects a set of low-density symbologies in order to attempt to decode the symbol in the captured image at block 210. On the other hand, if the focal plane corresponds to a target 113b that is within the second working range (i.e., between NWD2 and FWD2), it may be assumed that the symbol is a high-density symbol, such that the controller 127 selects a set of high-density symbologies in order to attempt to decode the symbol at block 210. It is recognized that the working ranges depicted in FIGS. 2 and 3 include some overlap. In such a case, a target between FWD1 and FWD2 may result in selecting the first imager 111a, whereas a target between NWD2 and FWD2 may result in selecting the second imager 111b.

Although each set of symbologies may include multiple symbologies, it nonetheless limits the number of symbologies that the controller 127 uses in attempting to decode the symbol, thereby allowing the reader 100 to decode multiple symbologies that require different decoding parameters, without having to inefficiently utilize processing power in attempting all possible symbologies.

Figure 5:
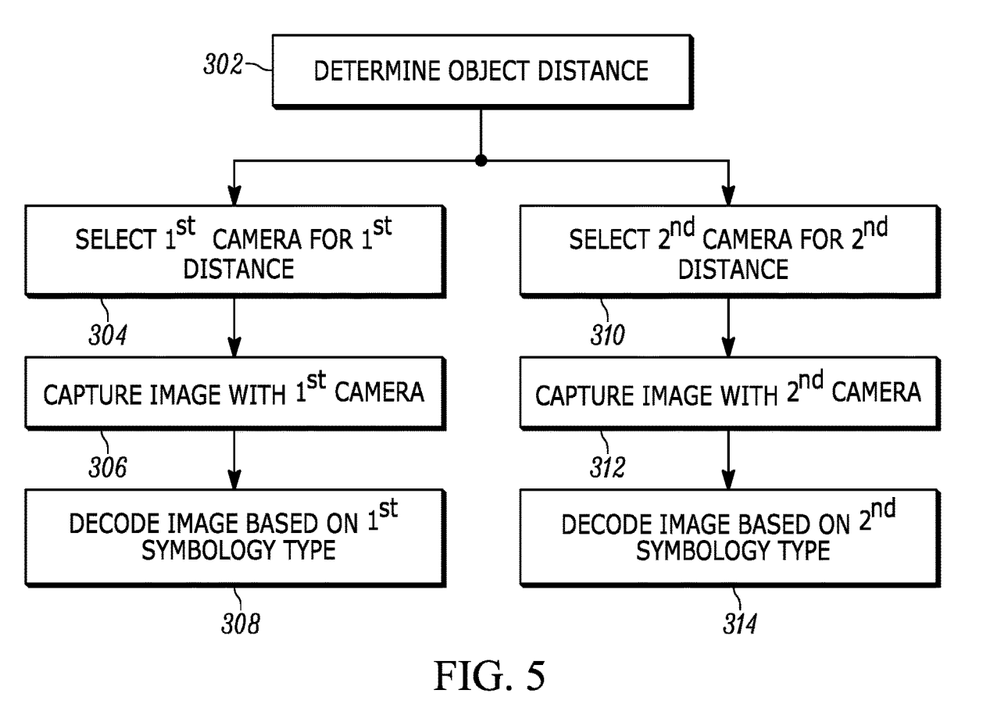
FIG. 5 is a flowchart of a method of capturing images of symbols and decoding symbols based on the distance of the target from the reader in accordance with the embodiment of FIG. 3.

FIG. 5 is another embodiment of a method for capturing images of symbols and decoding symbols based on the distance of the target from the reader 100 that may be used with a reader 100 having multiple imaging assemblies as in the embodiment of FIG. 3. Beginning at block 302, the controller 127 determines the distance of the object using, for example, a rangefinder, parallax detection, magnification detection, etc. as discussed above. Based on the determined distance, the controller 127 selects the imager 111a, 111b used to capture an image of the symbol. In an embodiment, the controller 127 may also selecting the illumination assembly based on the determined distance, by activating the corresponding illumination source 119a, 119b. For example, if the target 113a is in the first working distance range (i.e., between NWD1 and FWD1), the controller may select the first imager 111a and first illumination source 119a. If the target 113b is in the second working distance range (i.e., between NWD2 and FWD2), then the controller 127 may select the second imager 111b and the second illumination source 119b.

If the first imager 111a is selected at block 304, the controller 127 causes the imager 111b to capture an image of the target 113a at block 306. In capturing an image with the first imager 111a, the controller 127 decodes the symbol in the image based on a first symbology type (e.g., UPC, etc.) at block 308. Otherwise, if the second imager 111b is selected at block 310, the controller 127 causes the second imager 111b to capture the image at block 312, and the controller 127 decodes the symbol in the image based on a second symbology type (e.g., direct part marking, dot code, etc.) at block 314. In an embodiment, each symbology type may correspond to a particular symbology, though, in another embodiment, the symbology types correspond to different sets of symbologies, such as low-density symbologies and high-density symbologies. Further, different symbology types may reflect symbols that have been printed using different marking processes (e.g., direct part marking vs. ink). In another embodiment, those parameters may be stored within, or called upon by, the above-described modules, such that the selection of an imager 111a, 111b corresponds to the controller 127 selecting a particular module 131a, 131b.

Figure 6:
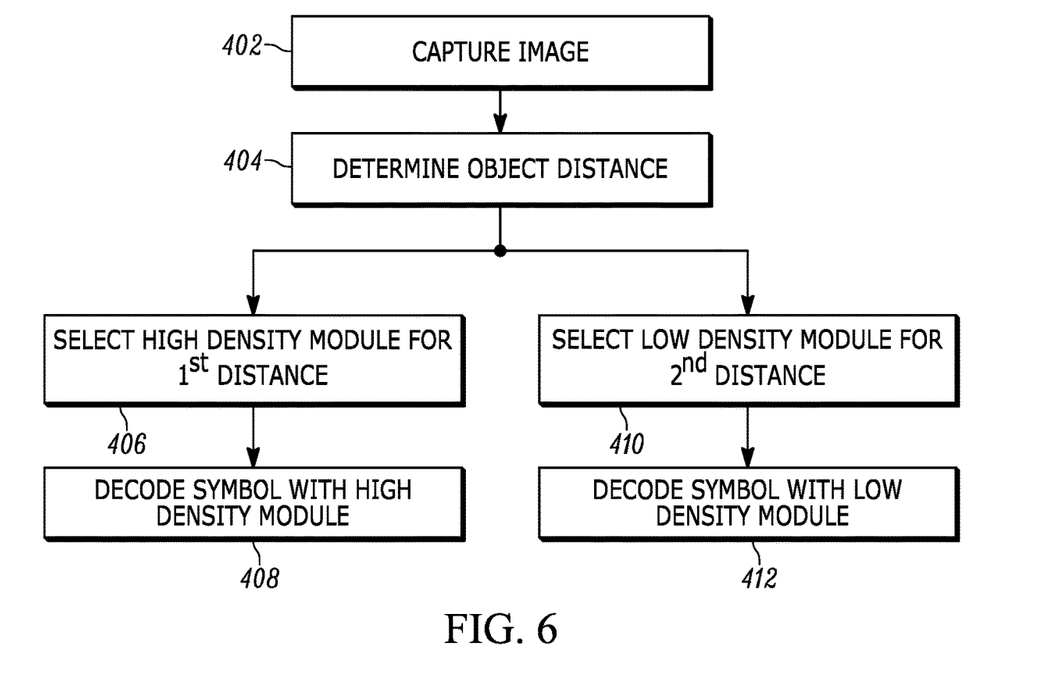
FIG. 6 is a flowchart of a method of capturing images of symbols and decoding symbols based on the distance of the target from the reader in accordance with an embodiment.

FIG. 6 is a further embodiment of a method for capturing images of symbols and decoding symbols based on the distance of the target from the reader 100 that may be used with a reader 100 having multiple decoding modules as in the embodiments of FIGS. 2 and 3. The method of FIG. 6 may be utilized with either embodiment for capturing images of symbols and decoding symbols as described above with respect to FIGS. 4 and 5. For example, using either method of FIG. 4 or 5, an image of the target 113a, 113b may be captured at block 402 and the distance of the object from the reader 100 may be determined at block 404. The method then selects the module 131a, 131b corresponding to the determined distance of the object, such as a high density module 131b for a target 113b at block 406, and the symbol in the captured image is then decoded using the high-density module 131b at block 408. If the low-density module 131a is selected at block 410, the symbol in the captured image is decoded using the low-density module 131a at block 412. As previously disclosed, each module 131a, 131b may correspond to a different symbology or set of symbologies (e.g., low-density symbologies, high-density symbologies), as well as different parameters, such as different illumination states. Although only two modules are shown, a reader 100 may be equipped with any number of modules each corresponding to a particular symbology and parameters for decoding the symbology, or sets of symbologies and parameters for decoding the symbologies.

Figure 7:
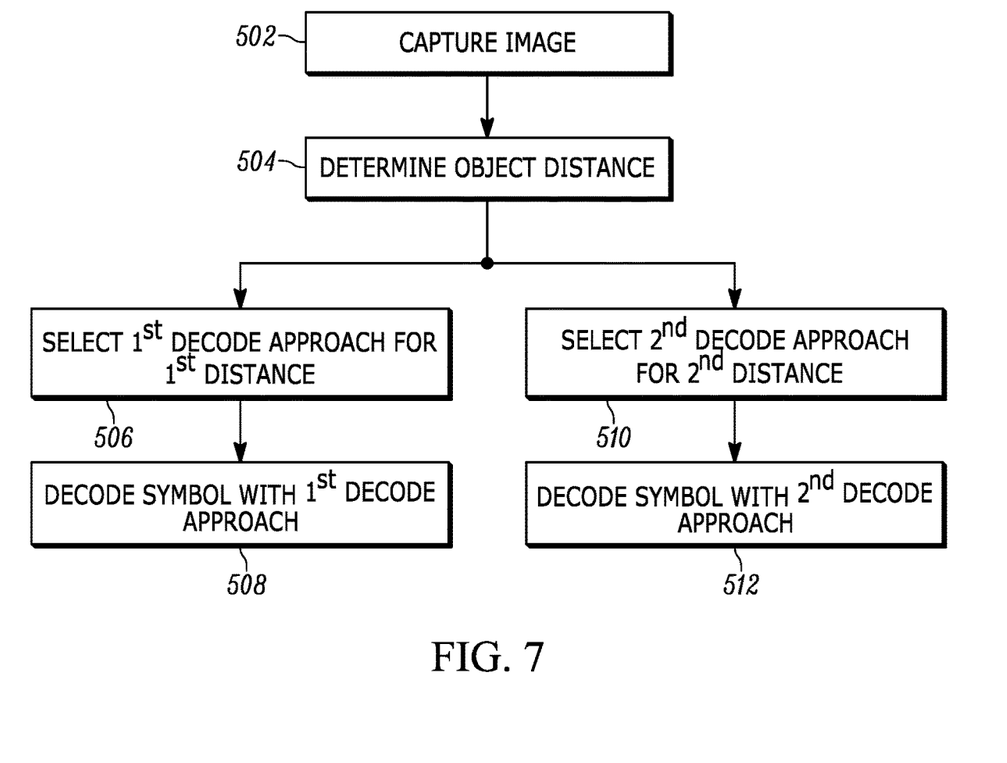
FIG. 7 is a flowchart of a method of capturing images of symbols and decoding symbols based on the distance of the target from the reader in accordance with another embodiment.

FIG. 7 is yet another embodiment of a method for capturing images of symbols and decoding symbols based on the distance of the target from the reader 100 that may be used with a reader 100 having multiple decoding approaches as in the embodiments of FIGS. 2 and 3. The method of FIG. 7 may be utilized with either embodiment for capturing images of symbols and decoding symbols as described above with respect to FIGS. 4 and 5. For example, using either method of FIGS. 4 and 5, an image of the target 113a, 113b may be captured at block 502 and the distance of the object from the reader 100 may be determined at block 504. The method then selects the decode approach corresponding to a first determined distance (or distance within a first range) of the object at block 506, and the symbol in the captured image is then decoded using the decode approach at block 508. If a different decode approach based on a second determined distance (or distance within a second range) is selected at block 510, the symbol in the captured image is decoded using the decode approach at block 512. Each decoding approach may correspond to a different decoding algorithm (or set of decoding algorithms) for decoding different symbologies (or sets of symbologies) and/or utilizing different illumination states.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
    a housing;
    an imaging assembly positioned within the housing and comprising an image sensor, wherein the imaging assembly is configured to automatically vary a focal plane associated with the imaging assembly to focus on a symbol at a given distance from the imaging assembly, wherein the focal plane is where an image of the symbol is sharpest from an imaging surface of the image sensor, and the image sensor is configured to capture at least one of: light reflected from the symbol and light emitted from the symbol; and
    a controller operatively coupled to the imaging assembly, wherein the controller is configured in a first state to utilize a first parameter to decode a first symbology type and configured in a second state to utilize a second parameter to decode a second symbology type, the first symbology type being different from the second symbology type, the controller configured to switch between the first state to the second state in response to the focal plane associated with the imaging assembly.

2. The apparatus of claim 1, wherein the first state comprises a first symbology selection to read the first symbology type and the second state comprises a second symbology selection to read the second symbology type.

3. The apparatus of claim 1, further comprising an illumination assembly positioned within the housing and configured to emit light, wherein the first state comprises a first illumination state and the second state comprises a second illumination state, the first illumination state being different from the second illumination state.

4. The apparatus of claim 1, further comprising:
    a first illumination assembly positioned within the housing and configured to emit light, the first illumination assembly having a diffuser and a first illumination source; and
    a second illumination assembly positioned within the housing and configured to emit light, the second illumination assembly having a second illumination source, wherein the first state comprises activation of the first illumination source, and wherein the second state comprises activation of the second illumination source.

5. The apparatus of claim 1, wherein the first symbology type is a member of a first set of symbols, and the second symbology type is a member of a second set of symbols, wherein the controller is configured to decode at least some of the first set of symbols in response to a first focal plane associated with the imaging assembly and decode at least some of the second set of symbols in response to a second focal plane associated with the imaging assembly.

6. An apparatus comprising:
    a housing;
    a first imaging assembly positioned within the housing and comprising a first image sensor, wherein the first imaging assembly is configured to focus on a symbol at a first distance from the imaging assembly and the first image sensor is configured to capture at least one of: light reflected from the symbol and light emitted from the symbol;
    a second imaging assembly positioned within the housing and comprising a second image sensor, wherein the second imaging assembly is configured to focus on a symbol at a second distance from the imaging assembly and the second image sensor is configured to capture at least one of: light reflected from the symbol and light emitted from the symbol; and
    a controller operatively coupled to the first and second imaging assemblies and configured to switch between the first and second imaging assemblies in response to the distance of the symbol from the imaging assemblies, and wherein in response to switching to the first imaging assembly, the controller is configured to decode a first symbology type, and in response to switching to the second imaging assembly, the controller is configured to decode a second symbology type, the first symbology type being different from the second symbology type.

7. The apparatus of claim 6, wherein the first symbology type is a member of a first set of symbols and the second symbology type is a member of a second set of symbols, wherein the controller is configured to decode at least some of the first set of symbols in response to switching to the first imaging assembly, and decode at least some of the second set of symbols in response to switching to the second imaging assembly.

8. The apparatus of claim 6, further comprising an illumination assembly positioned within the housing and configured to emit light, wherein in response to switching to the first imaging assembly, the illumination assembly is configured to emit a first illumination type, and in response to switching to the second imaging assembly, the illumination assembly is configured to emit a second illumination type, the first illumination type being different from the second illumination type.

9. The apparatus of claim 6, further comprising:
    a first illumination assembly positioned within the housing and configured to emit light, the first illumination assembly having a diffuser and a first illumination source; and
    a second illumination assembly positioned within the housing and configured to emit light, the second illumination assembly having a second illumination source,
    wherein in response to switching to the first imaging assembly, the first illumination source is activated, and wherein in response to switching to the second illumination assembly, the second illumination source is activated.

10. The apparatus of claim 6, further comprising an aiming assembly configured to project an image on the symbol, wherein the controller is configured to determine the distance of the symbol from the imaging assemblies based on one or more of: parallax of the image, magnification of the image, and contrast between adjacent pixels in the image as captured by the imaging assembly.

11. The apparatus of claim 6, further comprising a rangefinder assembly configured to determine the distance of the symbol from the imaging assemblies.

12. An apparatus comprising:
a housing;
an imaging assembly positioned within the housing and comprising an image sensor, wherein the image sensor is configured to capture at least one of: light reflected from the symbol and light emitted from the symbol; and
a controller operatively coupled to the imaging assembly and comprising a first module configured to decode a high-density symbol having at least one element with a width of less than 3 mils and a second module configured to decode a low-density symbol having at least one element with a width of greater than 5 mils, wherein the controller is configured to switch between the first and second modules in response to a distance of the symbol from the imaging assembly.

13. The apparatus of claim 12, wherein the high-density symbol is a member of a first set of high-density symbols and the low-density symbol is a member of a second set of low-density symbols, wherein the controller is configured to decode at least some of the first set of high-density symbols in response to switching to the first module, and decode at least some of the second set of low-density symbols in response to switching to the second module.

14. The apparatus of claim 12, further comprising an illumination assembly positioned within the housing and configured to emit light, wherein in response to switching to the first module, the illumination assembly is configured to emit a first illumination type, and in response to switching to the second module, the illumination assembly is configured to emit a second illumination type, the first illumination type being different from the second illumination type.

15. The apparatus of claim 12, further comprising:
a first illumination assembly positioned within the housing and configured to emit light, the first illumination assembly having a diffuser and a first illumination source; and
a second illumination assembly positioned within the housing and configured to emit light, the second illumination assembly having a second illumination source,
wherein in response to switching to the first module, the first illumination source is activated, and wherein in response to switching to the second module, the second illumination source is activated.

16. The apparatus of claim 12, further comprising an aiming assembly, wherein the image sensor is configured to capture an image of the aiming light on the symbol, and wherein the controller is configured to determine the distance of the symbol from at least one of: parallax of the image of the aiming light on the symbol, size of the image of the aiming light on the symbol, and sharpness of the image of the aiming light on the symbol.

17. The apparatus of claim 12, further comprising a rangefinder assembly configured to determine the distance of the symbol from the imaging assemblies.

18. An apparatus comprising:
a housing;
an imaging assembly positioned within the housing and comprising an image sensor, wherein the image sensor is configured to capture at least one of: light reflected from the symbol and light emitted from the symbol;
an illumination assembly positioned within the housing and configured to emit light; and
a controller operatively coupled to the imaging assembly and the illumination assembly, wherein the controller is configured in a first state to utilize at least one of: a first decode approach to decode a first symbology type and a first illumination parameter to capture an image of the first symbology type and configured in a second state to utilize at least one of: a second decode approach to decode a symbology type and a second illumination parameter to capture an image of the second symbology type, the controller configured to switch between the first state to the second state in response to a distance of the symbol from the imaging assembly.

19. The apparatus of claim 18, further comprising:
a first illumination assembly positioned within the housing and configured to emit light, the first illumination assembly having a diffuser and a first illumination source; and
a second illumination assembly positioned within the housing and configured to emit light, the second illumination assembly having a second illumination source,
wherein the first illumination parameter comprises activation of the first illumination source, and wherein the second illumination parameter comprises activation of the second illumination source.

20. The apparatus of claim 18, wherein the first symbology selection is from a first set of symbols and the second symbology selection is from a second set of symbols, wherein the controller is configured to decode at least some of the first set of symbols in response to switching to the first state and decode at least some of the second set of symbols in response to switching to the second state.

21. The apparatus of claim 18, further comprising an aiming assembly configured to project an image on the symbol, wherein the controller is configured to determine the distance of the symbol from the imaging assemblies based on one or more of: parallax of the image, magnification of the image, and contrast between adjacent pixels in the image as captured by the imaging assembly.

22. The apparatus of claim 18, further comprising a rangefinder assembly configured to determine the distance of the symbol from the imaging assemblies.

23. The apparatus of claim 18, wherein the first decode approach comprises a first decode algorithm configured to decode the first symbology type and the second decode approach comprises a second decode algorithm configured to decode the second symbology type, and wherein the first symbology type and second symbology type are different.

* * * * *